(12) United States Patent
Bilgen et al.

(10) Patent No.: US 9,686,265 B2
(45) Date of Patent: Jun. 20, 2017

(54) METHODS AND APPARATUS TO FACILITATE SINGLE SIGN-ON SERVICES

(75) Inventors: Aras Bilgen, Hillsboro, OR (US); James P. Ketrenos, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,971

(22) PCT Filed: Dec. 28, 2011

(86) PCT No.: PCT/US2011/067530
§ 371 (c)(1),
(2), (4) Date: Jun. 10, 2013

(87) PCT Pub. No.: WO2013/100953
PCT Pub. Date: Jul. 4, 2013

(65) Prior Publication Data
US 2014/0208408 A1  Jul. 24, 2014

(51) Int. Cl.
*G06F 21/41* (2013.01)
*H04L 29/06* (2006.01)
*H04L 29/08* (2006.01)

(52) U.S. Cl.
CPC .......... *H04L 63/0815* (2013.01); *G06F 21/41* (2013.01); *H04L 67/02* (2013.01)

(58) Field of Classification Search
CPC ....... G06F 21/41; H04L 63/0815; H04L 9/08; H04L 63/0846
USPC .......................... 713/182, 183; 726/8, 6, 5, 4
See application file for complete search history.

(56) References Cited

U.S. PATENT DOCUMENTS

| | | | |
|---|---|---|---|
| 6,178,511 B1 | 1/2001 | Cohen et al. |
| 7,216,292 B1 | 5/2007 | Snapper et al. |
| 7,404,204 B2 | 7/2008 | Davenport et al. |
| 7,412,720 B1 | 8/2008 | Frey et al. |
| 7,698,734 B2 | 4/2010 | Kupherstein et al. |

(Continued)

FOREIGN PATENT DOCUMENTS

| | | |
|---|---|---|
| CN | 101159557 | 4/2008 |
| JP | 2000259566 | 9/2000 |

(Continued)

OTHER PUBLICATIONS

International Bureau, "International Preliminary Report on Patentability," issued in connection with corresponding International Patent Application No. PCT/US2011/067530, mailed Jul. 10, 2014 (6 pages).

(Continued)

*Primary Examiner* — Carl Colin
*Assistant Examiner* — Vance Little
(74) *Attorney, Agent, or Firm* — Hanley, Flight & Zimmerman, LLC (57) ABSTRACT

Methods, articles of manufacture and apparatus are disclosed to facilitate single sign-on services. An example method includes monitoring web session activity for an indication of entry of first credentials, identifying an SSO framework associated with the device in response to detecting a context event indicative of web session termination, querying the SSO framework for second credentials associated with the web session, and configuring SSO services on the device when the second credentials are absent from the SSO framework.

21 Claims, 5 Drawing Sheets

(56) References Cited

U.S. PATENT DOCUMENTS

| | | | |
|---|---|---|---|
| 8,539,568 B1* | 9/2013 | Milas | 726/8 |
| 2003/0040995 A1 | 2/2003 | Daddario et al. | |
| 2005/0177731 A1 | 8/2005 | Torres et al. | |
| 2006/0218629 A1 | 9/2006 | Pearson et al. | |
| 2009/0007248 A1 | 1/2009 | Kovaleski | |
| 2009/0228978 A1* | 9/2009 | Cooley | G06F 21/31 726/19 |
| 2009/0292927 A1* | 11/2009 | Wenzel | G06F 21/41 713/185 |
| 2010/0205034 A1 | 8/2010 | Zimmerman et al. | |
| 2010/0319051 A1* | 12/2010 | Bafna et al. | 726/1 |
| 2012/0144024 A1* | 6/2012 | Lee | 709/224 |
| 2012/0204249 A1* | 8/2012 | Gonzalez | G06F 21/41 726/8 |

FOREIGN PATENT DOCUMENTS

| | | |
|---|---|---|
| JP | 2002149605 | 5/2002 |
| JP | 2002278927 | 9/2002 |
| JP | 2005519365 | 6/2005 |
| JP | 2007200217 | 8/2007 |

OTHER PUBLICATIONS

"Introduction to Single Sign-On", The Open Group, retrieved Nov. 14, 2011 from <http://www.opengroup.org/security/sso/sso_intro.htm> (3 pages).

"Single Sign-On", Wikipedia, retrieved Nov. 30, 2011 from <http://en.wikipedia.org/w/index.php?title=Single_sign-on&printable=yes> (3 pages).

"List of Single Sign-On Implementations", Wikipedia, retrieved Nov. 30, 2011 from <http://en.wikipedia.org/w/index.php?title=List_of_single_sign-on_implementations&> (2 pages).

International Searching Authority, "International Search Report", issued in connection with PCT application No. PCT/US2011/067530, mailed Sep. 13, 2012 (3 pages).

International Searching Authority, "Written Opinion", issued in connection with PCT application No. PCT/US2011/067530, mailed Sep. 13, 2012 (4 pages).

European Patent Office, "Extended European Search Report," issued in connection with European Patent Application No. 11878524.5, mailed Jun. 11, 2015 (8 pages).

Mozilla, "Password Manager—Remember, Delete and Change Saved Passwords in Firefox," Firefox, retrieved from <http://support.mozilla.org/en-US/kb/password-manager-remember-delete-change-passwords>, retrieved on Jun. 2, 2015 (3 pages).

Korean Intellectual Property Office, "The Notice of Preliminary Rejection," issued in connection with Korean Patent Application No. 2014-7018013, mailed Aug. 24, 2015 (9 pages).

Japan Patent Office, "Non-Final Notice of Reasons for Rejection," issued in connection with Japanese Patent Application No. 2014-547177, mailed Jun. 30, 2015 (7 pages).

Japanese Patent Office, "Notice of Decision to Grant" issued in connection with Japanese Patent Application No. 2014-547177 on Mar. 29, 2016 (9 pages).

Korean Intellectual Property Office, "Notice of Preliminary Rejection," issued in connection with Korean Application No. 2014/7018013, Mar. 25, 2016, 6 pages.

European Patent Office, "Intention to Grant", issued in connection with European Patent Application No. 11878524.5, dated May 4, 2016 (31 pages).

The State Intellectual Property Office of China, "First Notification of Office Action," issued in connection with Application No. 201180076068.2, on Feb. 29, 2016 (10 pages).

State Intellectual Property Office of the People'S Republic of China, "Notification of the 2nd Office Action," issued in connection with Chinese Patent Application No. 2011800760682, mailed Oct. 25, 2016, 22 pages.

* cited by examiner

METHODS AND APPARATUS TO FACILITATE SINGLE SIGN-ON SERVICES

FIELD OF THE DISCLOSURE

This disclosure relates generally to subscriber authentication, and, more particularly, to methods and apparatus to facilitate single sign-on services.

BACKGROUND

In recent years, online services have become increasingly available and utilized by subscribers. Subscribers and/or users of such online services typically require one or more credentials to be verified before access is authorized. Each subscriber may have multiple accounts associated with one or more online services and, to reduce a risk associated with account breach, the subscriber may employ one or more different credentials for each online service used.

To assist subscribers with credential management, single sign on (SSO) access techniques may be employed on devices that store subscriber credentials. An SSO framework may facilitate one or more authentication tasks after the subscriber provides correct credentials for an online service, and after the subscriber authorizes the SSO framework to proceed with future authentication requests.

DETAILED DESCRIPTION

Methods and apparatus are disclosed to facilitate single sign-on services. An example method includes monitoring web session activity for an indication of entry of first credentials, identifying an SSO framework associated with the device in response to detecting a context event indicative of web session termination, querying the SSO framework for second credentials associated with the web session, and configuring SSO services on the device when the second credentials are absent from the SSO framework.

A single sign-on (SSO) framework stores user credentials for one or more services (e.g., online services, web services, etc.) in a central location. The central location is typically accessible by a device on which the SSO framework resides (e.g., resides by way of OEM installation, user installation, enterprise network management push, etc.), which allows one or more applications (e.g., web applications) to authenticate a subscriber/user (referred to generally herein as "user" or "subscriber" interchangeably without limitation) without requiring repeated subscriber permission(s) and/or authorization(s). For example, a subscriber to Facebook® may provide an SSO framework with a username and password (credentials) so that future authentication challenges by the Facebook® website and/or Facebook® application(s) (e.g., photo viewing/posting application) may be handled by the SSO framework in a manner transparent to the subscriber. In the event the Facebook® subscriber attempts to post a photo, the SSO framework handles authentication in response to a post request by the subscriber (e.g., selecting a photo on the wireless device and selecting a post indicator) to facilitate a streamlined subscriber experience (e.g., a two-tap experience).

In the event the subscriber device (e.g., wireless telephone, tablet, computer, etc.) does not employ an SSO framework, or in the event the subscriber has not activated and/or otherwise configured the SSO framework, then a subscriber request to utilize Facebook® services requires repeated authentication actions by the subscriber for each visit. A device may include the SSO framework, but the device may lack an intuitive user interface to allow the user to setup one or more SSO services. In other instances, the SSO framework is pre-installed on the device, but in a dormant state. Some users lack the technical knowledge to activate and/or otherwise configure SSO service, even if such users know that an SSO framework is on the device. In some examples, the web service employs cookies to maintain a logon session, but the cookies may not facilitate authentication of one or more applications associated with the web service (e.g., photo posting application). In other examples, the web service deletes cookies when the device is powered off and/or when a browser application is closed. As such, a subsequent visit to the web service requires the subscriber to enter one or more credentials prior to use.

Example methods, articles of manufacture and apparatus disclosed herein monitor device usage activity for one or more opportunities to invoke device SSO service(s) and/or SSO service configuration in a minimally intrusive manner. Additionally, example methods, articles of manufacture and apparatus disclosed herein facilitate SSO service discovery on a user device. In the event a subscriber has already entered one or more credentials associated with an online service, a web service and/or associated applications, example methods, articles of manufacture and apparatus disclosed herein request subscriber permission to utilize such credentials for one or more future session(s) without requiring duplicative reentry by the subscriber.

Figure 1:
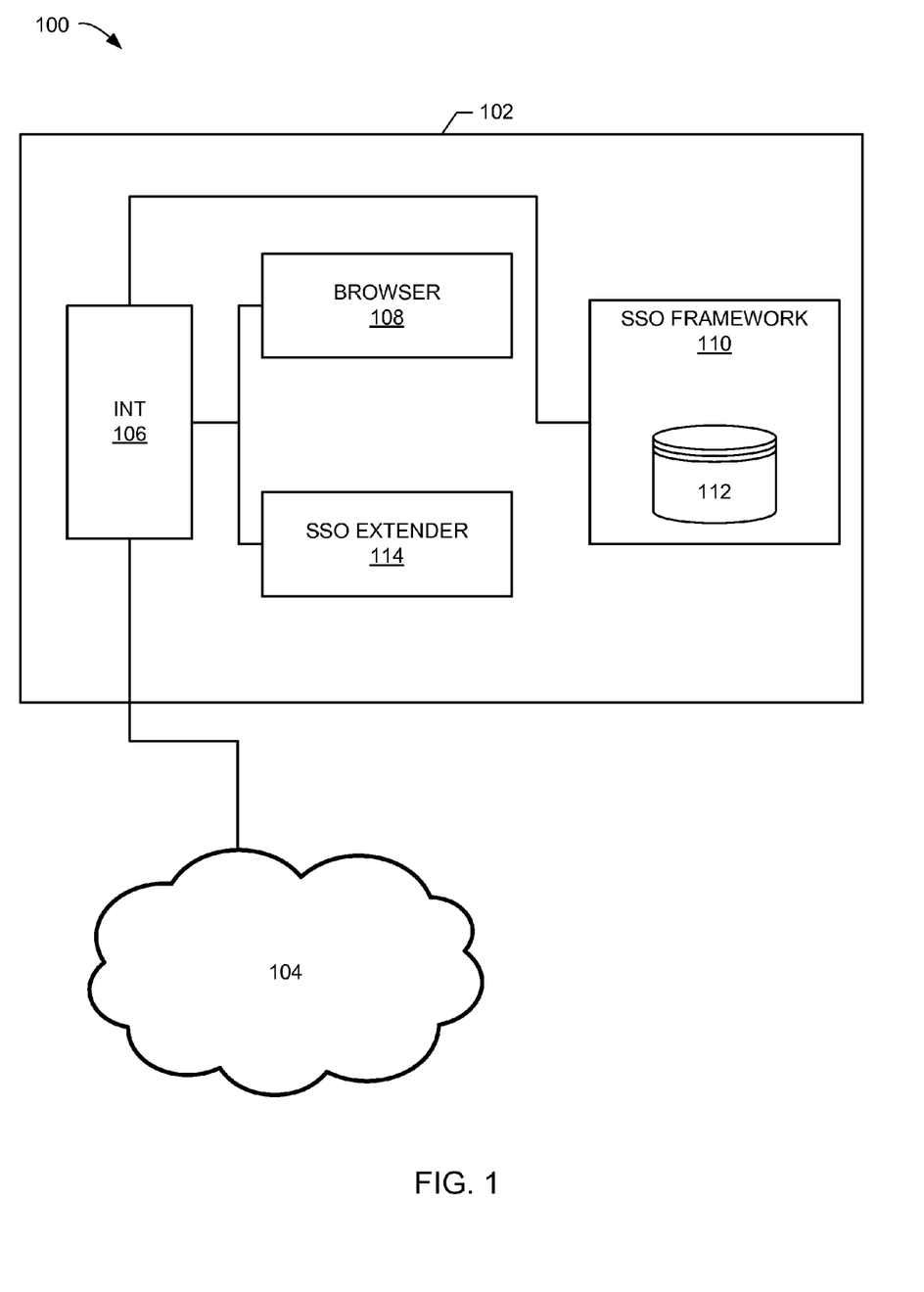
FIG. 1 is a schematic illustration of an example device environment to facilitate single sign-on (SSO) services.

FIG. 1 is a schematic illustration of an example device environment 100 to facilitate single sign-on (SSO) services. The device environment 100 includes a user/subscriber device 102, which may include a personal computer, a tablet computer, a mobile telephone, a personal digital assistant and/or any other device capable of communication to a network 104, such as the Internet. In the illustrated example of FIG. 1, the device 102 includes an interface 106 to facilitate communication with the network 104, a browser 108, and an SSO framework 110 having a corresponding SSO credentials database 112. The example SSO framework 110 may be implemented by a third party system, solution and/or protocol including, but not limited to Microsoft Active Directory Federation Services, Microsoft Forefront Identity Manager, Central Authentication Service protocol, and/or Cosign by the Research Systems Unix Group.

The example device 102 also includes an SSO extender 114 to facilitate, in part, discovery of one or more SSO services available to a user of the device 102, monitoring of device browser usage by the user, and/or configuring the device 102 for SSO-related services, as described in further detail below. In some examples, the SSO extender 114 may be implemented as a device plug-in or browser plug-in. In other examples, the SSO extender 114 may be implemented as an application for execution by the example device 102. Each example SSO framework 110 may include a corresponding application programming interface (API) published and/or otherwise made available by the SSO framework developer/manufacturer to serve as a programmatic interface used to control and/or otherwise interact with the SSO framework 110. Such example APIs may be stored in the example SSO extender 114 to allow control and/or interaction with one or more SSO framework(s) 110 by one or more differing manufacturers.

Figure 2:
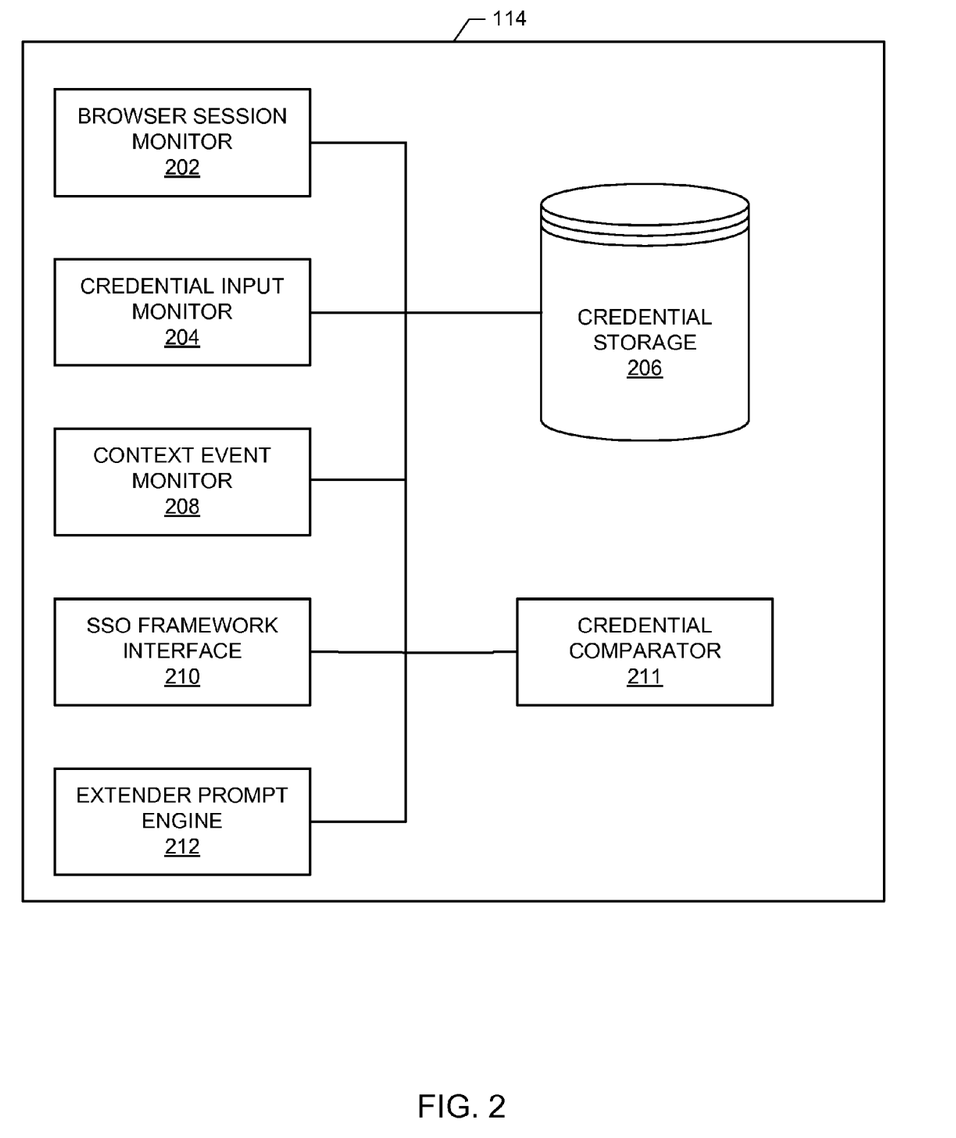
FIG. 2 is a schematic illustration of an example SSO extender of FIG. 1.

FIG. 2 is a schematic illustration of an example implementation of the example SSO extender 114 of FIG. 1. In the illustrated example of FIG. 2, the SSO extender 114 includes a browser session monitor 202, a credential input monitor 204, a credential storage 206, a context event monitor 208, an SSO framework interface 210, a credential comparator 211, and an extender prompt engine 212. In operation, the example browser session monitor 202 monitors browser activity for one or more active browsing session(s) by a user of the example device 102. In response to a user initiating a session, such as visiting a website or invoking an online service, the example credential input monitor 204 monitors for one or more instances of credential entry. In some examples, one or more blank and/or partially populated fields are presented to the user to fill-out/complete before the user selects a submit button with the populated credentials. In other examples, cookies associated with the visited website maintain a logged-in state, thus, allowing the user to access the website without being presented with the blank and/or partially populated credential fields.

In the event the user enters information in one or more credential fields, the example credential input monitor 204 stores the entered credentials in the example credential storage 206 for later comparison, as described in further detail below. While the user is logged on to the website and/or web service, the example context event monitor 208 monitors the browser activity for one or more context event(s). The example context events may be any action(s) and/or event(s) that occur that are indicative of user termination of the current web session, online session and/or application. In some examples, the context event includes a user selection of a log off button of the current website, minimizing the browser graphical user interface, and/or a period of inactivity of the example browser 108 and/or other portion of the device 102 (e.g., device keyboard presses, device touch screen detection, etc.).

In response to the detection of one or more context event(s), the example SSO framework interface 210 detects the presence of an SSO framework 110 on the example device 102. The SSO framework discovery performed by the example SSO framework interface 210 identifies one or more SSO service(s) available on the example device 102 without requiring user configuration and/or involvement, particularly in some example circumstances where the SSO service(s) are cryptic and/or not readily apparent to the user of the device 102. The example SSO framework interface 210 queries the discovered SSO framework to determine if logon credentials are stored therein. For example, the SSO framework interface 210 may query the example SSO credentials database 112 to determine whether user credentials were previously provided to the SSO framework 110. If so, then the example SSO extender 114 takes no further action because, in part, the user device 102 and/or browser 108 of the user device 102 is already configured to facilitate SSO services for the visited website.

On the other hand, in the event that the example SSO framework interface 210 does not identify one or more indications of user credentials associated with the visited website, the example SSO framework interface 210 determines whether one or more prior instructions are stored in the SSO framework 110 that indicate user credentials should not be stored for the visited website. For example, a user of the example device 102 may have been previously presented with an opportunity to store authentication credentials for the visited website, and responded with a desire to prevent future prompts to store such information on the example device 102 and/or browser 108. In such examples, the SSO framework interface 210 refrains from further analysis and/or prompting for the visited website. On the other hand, if the example SSO framework interface 210 does not identify one or more instructions, messages and/or indications indicative of a user request to prevent the storage and/or management of credentials, further credential management is initiated.

The example SSO credentials database 112 and/or one or more alternate/additional portions of the SSO framework 110 is queried to identify authentication fields associated with the current website. The authentication fields required by the current website may be located in and/or otherwise defined by one or more plug-ins stored in the example SSO framework 110 and/or a memory thereof (e.g., in the example SSO credentials database 112). In some examples, a website requires a username and corresponding password for successful logon. In other examples, a website requires one or more additional indications of authentication, such as a challenge word and/or challenge question (e.g., a question associated with a marriage date of the user, a question associated with a marriage city of the user, etc.). The one or more combinations of credentials may be identified by the example SSO framework interface 210 by examining one or more plug-ins and/or memories of the SSO framework 110. In still other examples, the device 102 is preinstalled with one or more plug-ins having information related to the one or more credentials needed for website authentication. Other examples include a download of one or more plug-ins from the website of interest to the device 102.

The example credential input monitor 204 compares previously entered credentials stored in the example credential storage 206 to the credential requirements defined by and/or otherwise identified by the one or more plug-ins associated with the website of interest (e.g., the current website). If the previously entered credentials are the same as those defined by the plug-in, as determined by a comparison(s) performed by the example credential comparator 211, then the example extender prompt engine 212 prompts the user with a permission request to use their credentials in the future for authentication with the website. On the other hand, if the user of the example device 102 did not enter credentials to gain access (e.g., a non-expired cookie allowed the user to access the website), then the example credential comparator 211 and/or example credential input monitor 204 identifies one or more missing and/or alternate credentials and/or credential fields required for authentication to the website. The example extender prompt engine 212 prompts the user for both the missing credentials required for authentication and a permission request to use such credentials for future logon attempts. In the event the user declines, then the example SSO extender 114 takes no further action and refrains from asking the user for such permissions in the future. On the other hand, if the user accepts and enters the required credentials, then such credentials are saved to the example credential storage 206, the example SSO framework 110, and/or the example SSO credentials database 112.

In some examples, the SSO framework interface 210 stores permission information received from a user to the SSO credentials database 112 that includes an expiration date on which the user will need to re-authenticate. For instance, the credential input monitor 204 may require manual re-entry of user credentials after seven days to make sure a valid account holder is still in possession and/or has access to the example device 102. After manual re-entry of the user credentials is detected by the example credential input monitor 204, automatic user authentication for the website may resume. In other examples, the SSO framework interface 210 monitors an Internet protocol (IP) address and/or a portion of an IP address associated with the device 102. If the IP address changes, then the example credential input monitor 204 may require manual re-entry of user credentials to protect one or more user accounts from breach based on suspected theft of the device 102. After manual re-entry of the user credentials is detected by the example credential input monitor 204, automatic user authentication for the website may resume. In some examples, the browser session monitor 202 detects whether cookies and/or temporary files associated with the device 102 are cleared. If so, then the example credential input monitor 204 may require manual re-entry of user credentials prior to resuming automatic user authentication when visiting the website(s).

While an example manner of implementing the SSO extender 114 has been illustrated in FIGS. 1 and 2, one or more of the elements, processes and/or devices illustrated in FIGS. 1 and 2 may be combined, divided, re-arranged, omitted, eliminated and/or implemented in any other way. Further, the example interface 106, the example browser 108, the example SSO framework 110, the example SSO credentials database 112, the example SSO extender 114, the example browser session monitor 202, the example credential input monitor 204, the example credential storage 206, the example context event monitor 208, the example SSO framework interface 210, the example credential comparator 211, and/or the example extender prompt engine 212 of FIGS. 1 and 2 may be implemented by hardware, software, firmware and/or any combination of hardware, software and/or firmware. Thus, for example, any of the example interface 106, the example browser 108, the example SSO framework 110, the example SSO credentials database 112, the example SSO extender 114, the example browser session monitor 202, the example credential input monitor 204, the example credential storage 206, the example context event monitor 208, the example SSO framework interface 210, the example credential comparator 211, and/or the example extender prompt engine 212 could be implemented by one or more circuit(s), programmable processsor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example interface 106, the example browser 108, the example SSO framework 110, the example SSO credentials database 112, the example SSO extender 114, the example browser session monitor 202, the example credential input monitor 204, the example credential storage 206, the example context event monitor 208, the example SSO framework interface 210, the example credential comparator 211, and/or the example extender prompt engine 212 are hereby expressly defined to include one or more tangible computer readable medium(s) such as a memory, DVD, CD, BluRay, etc. storing the software and/or firmware. Further still, the example SSO extender 114 of FIGS. 1 and 2 may include one or more elements, processes and/or devices in addition to, or instead of, those illustrated in FIGS. 1 and 2, and/or may include more than one of any or all of the illustrated elements, processes and devices.

Figure 3:
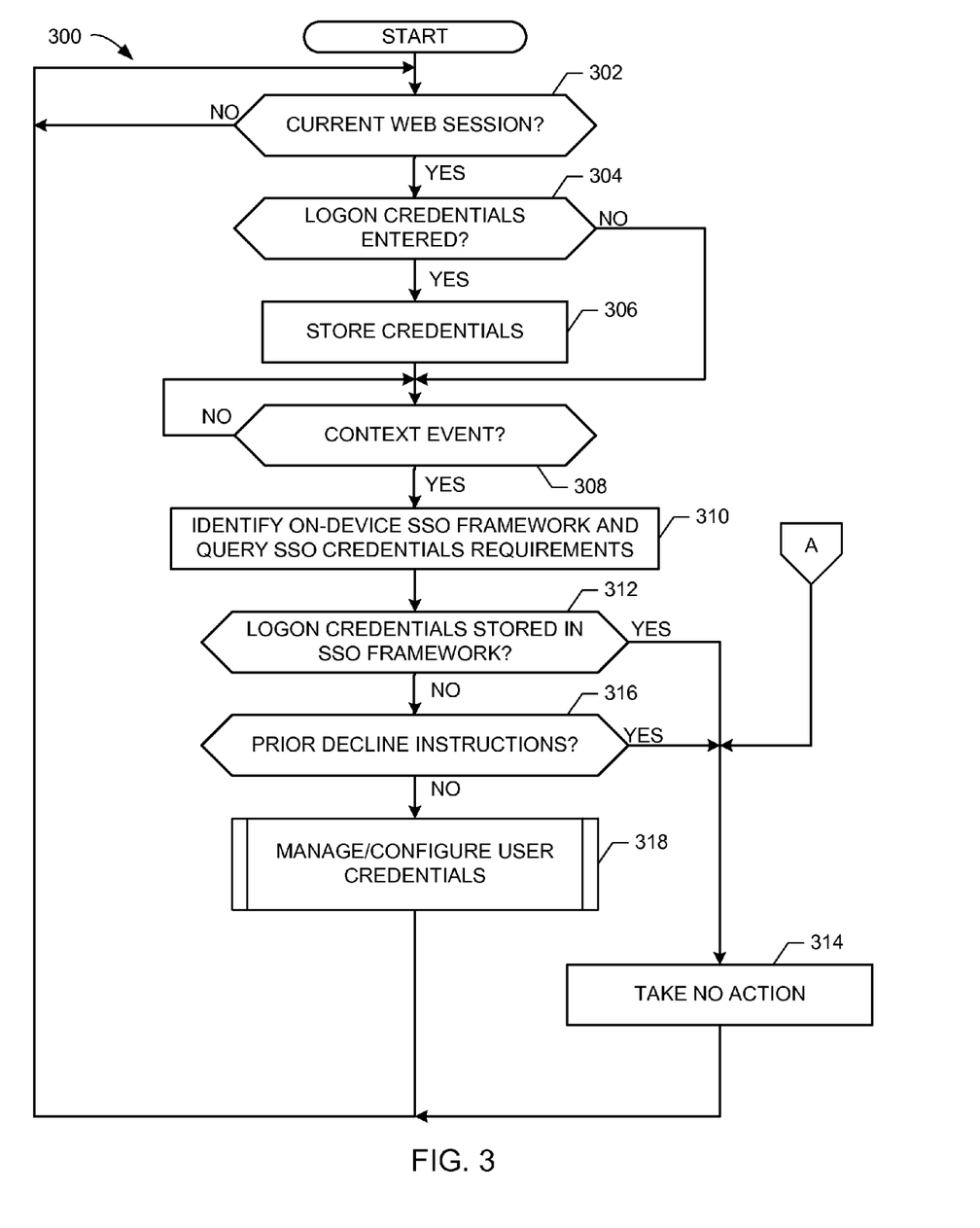
FIGS. 3 and 4 are flowcharts representative of example machine readable instructions which may be executed to perform configuration of SSO services for the example device environment of FIG. 1 and/or to implement the example SSO extender of FIGS. 1 and 2.

A flowchart representative of example machine readable instructions for implementing the SSO extender 114 of FIGS. 1 and 2 are shown in FIG. 3. In this example, the machine readable instructions comprise a program for execution by a processor such as the processor 512 shown in the example computer 500 discussed below in connection with FIG. 5. The program may be embodied in software stored on one or more tangible computer readable mediums such as a CD-ROM, a floppy disk, a hard drive, a digital versatile disk (DVD), a BluRay disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example SSO extender 114 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer readable instructions) stored on one or more tangible computer readable medium(s) such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3 and 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 300 of FIG. 3 begins at block 302 in which the example browser session monitor 202 monitors activity of a browser (e.g., the browser 108 of FIG. 1) for one or more active browsing session(s) by a user of the example device 102. If the example browser session monitor 202 does not detect and/or otherwise identify any browsing activity (block 302), the the example program 300 waits. On the other hand, in response to the example browser session monitor 202 detecting and/or otherwise identifying browsing activity (block 302), the example credential input monitor 204 monitors for one or more instances of credential entry (block 304). In some examples, the credential input monitor 204 detects one or more fields and/or field types of a browser page. Field types may include, but are not limited to, a user identification field, a username field, a password field, an account number field and/or a challenge question/answer field.

In the event one or more credentials is entered, such as a username, a password, a challenge question, etc., such entered credentials are stored in the example credential storage 206 (block 306). On the other hand, the example browser session monitor 202 may identify browsing activity (block 302), such as interaction with a new website, without detecting that any credentials have been entered (block 304), in which case the example program 300 proceeds to monitor for one or more context event(s) (block 308). One or more browser session(s) may occur without credential entry when, for example, one or more cookies persist in the example browser 108 that indicate the user is already authenticated. Cookies associated with Facebook®, for example, persist on devices to keep a user logged on, even after the browser 108 is closed and/or after the device is powered-on after being in a powered-off state.

The example context event monitor 208 detects one or more context events (block 308), such as one or more actions that are indicative of user termination of the current web session. In some examples, the context event detected by the context event monitor 208 includes a user selection of a log off button of the current website, minimizing the browser graphical user interface, and/or a period of inactivity with the website. The example SSO framework interface 210 performs one or more SSO framework discovery searches of the example device 102 (block 310) in response to detecting the one or more context event(s). To perform the one or more SSO framework discovery searches, the example SSO framework interface 210 may employ one or more function calls via application programming interfaces (APIs) associated with one or more SSO framework(s), such as the example SSO framework 110 of FIG. 1. In response to identifying the on-device SSO framework, the example SSO framework interface 210 queries a memory and/or other storage of the SSO framework (e.g., the SSO credentials database 112) for stored credentials (block 310).

In the event that the example SSO framework interface 210 identifies logon credentials associated with the current website (e.g., previously entered into one or more fields and stored in the example credential storage 206) stored in and/or by the example SSO framework 110 (block 312), then the example SSO extender 114 takes no further action (block 314) and/or suppresses further prompts (e.g., prompts to a user) because SSO functionality for the device 102 is already configured. However, if logon credentials associated with the current website are absent and/or otherwise not stored in and/or by the example SSO framework 110 (block 312), then the example SSO framework interface 210 proceeds with an SSO configuration of the example device 102. The example SSO framework interface 210 determines whether one or more prior instructions are stored in the SSO framework 110 that indicate user credentials should not be stored for the visited website (block 316). In some examples, a user of the device 102 may have previously visited the website and provided a decline request so that further prompts and/or requests to store credentials should not occur and/or otherwise be supressed. If so, the SSO extender 114 refrains from further analysis for the visited website in an effort to respect the prior desire of the user to prevent prompts and/or requests from occurring (block 314). On the other hand, if there is an absence of a decline request and/or no indication that further requests to store user credentials should be prevented (block 316), then the user credentials associated with the current website are managed and/or otherwise configured (block 318).

Figure 4:
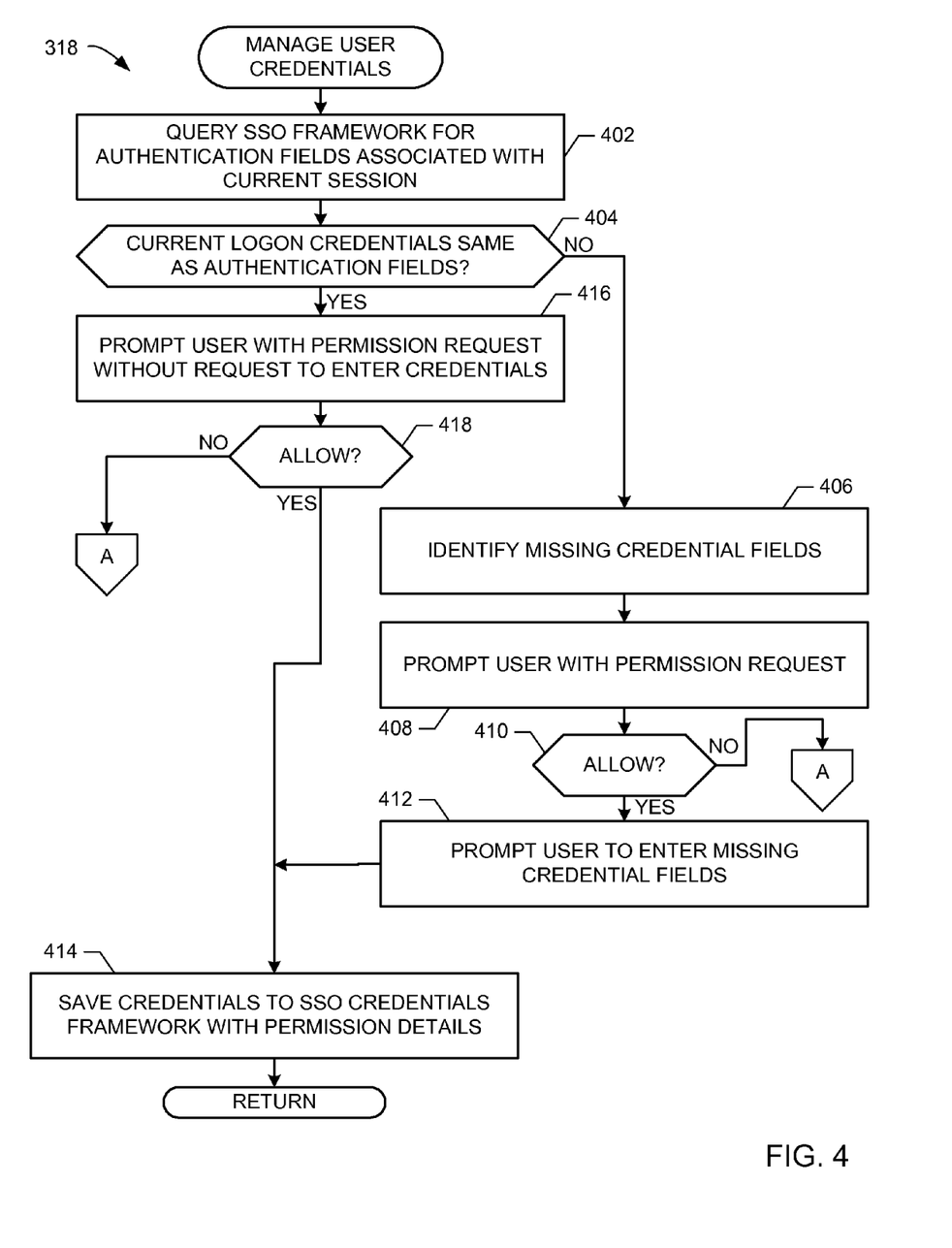

In the illustrated example of FIG. 4, the example SSO framework interface 210 queries and/or otherwise interacts with the SSO framework 110 for information associated with authentication requirements of the website of interest (block 402). The authentication requirements for a website may include any number of credential fields of one or more types and, upon entry of valid information in each field, access to the website is authorized (authentication requirements are satisfied). In some examples, the SSO framework interface 210 obtains information associated with credentials fields from one or more plug-ins associated with the website of interest. As described above, the one or more plug-ins associated with the website of interest may have been pre-installed on the device 102 at the time of manufacture (e.g., original equipment manufacturer (OEM) installation), and/or pre-installed by a re-seller of the device 102, etc. The one or more plug-ins may be stored in the example SSO credentials database 112 and/or one or more other portions of the example device 102. The example credential comparator 211 compares the credential information from the one or more plug-ins with credential information that may have been associated with website logon (block 404), such as credential information entered in a manner consistent with block 304 of FIG. 3.

If no credential information was initially entered to gain access to the website (block 404) (e.g., because of cookie permission(s)), then the example credential comparator 211 identifies the missing credential fields that are needed to authenticate with the website of interest (block 406). For example, the credential comparator 211 may determine that the needed credential fields and/or field types include a username, a password and/or one or more challenge questions. The example extender prompt engine 212 prompts the user with a permission request to confirm that the user is interested in saving the credential information for future use (block 408). If the user does not want to allow automatic website logon for future use (block 410), then further prompts are suppressed and control returns to example block 314 where the example SSO extender 114 takes no further action. Additionally, the example browser session monitor 202 may store one or more flags and/or other information to indicate that further prompts should be eliminated and/or otherwise supressed in the event the user re-visits the website of interest. On the other hand, in the event the extender prompt engine 212 receives a response indicative of a user's desire to proceed with credential storage (block 410), then the example extender prompt engine 212 causes one or more blank fields to be presented on the browser with one or more prompts of the type of credential information needed by the website (block 412).

The one or more credentials received by the extender prompt engine 212 via the one or more fields populated by user entry are forwarded to the example SSO framework interface 210 for storage to the example SSO framework 110 (block 414). In some examples, the received credentials are stored in the example SSO credentials database 112 and/or other storage of the example SSO framework 110 and/or one or more additional and/or alternate storage elements of the example device 102. In addition to storing the one or more credentials entered into the one or more blank fields, the example SSO framework interface 210 may also store permission details. Permission details may include, but are not limited to an expiration date of the entered credentials that require re-entry at a future date. In other examples, permission details include monitoring for an IP address change associated with the example device 102. If the IP address changes, which may indicate that the example device 102 has moved from a first location to a second location, the example SSO extender 114 may prompt for re-authorization via credential re-entry. Other examples of permission details include monitoring the example device 102 for an instance of cookie deletion and/or temporary file deletion that, when detected by the example SSO extender 114, prompts the extender prompt engine 212 to present credential fields via the browser 108.

In the event that the credential comparator 211 determines that prior credentials were entered to access the website (block 404), the example extender prompt engine 212 generates one or more prompts via the example browser 108 with a permission request to authorize future authentication using the entered credentials (block 416). If the example extender prompt engine 212 receives an indication that the previously entered credentials should not be utilized for future authentication (block 418), then control advances to block 314 and no further prompts will be invoked, thereby preventing the user of the device 102 from being annoyed with further prompt(s). On the other hand, in the event the example extender prompt engine 212 receives an indication that the previously entered credentials may be employed for future authentication when the website of interest is visited (block 418), the previously entered credentials are saved to the example SSO framework 110 (block 414).

Figure 5:
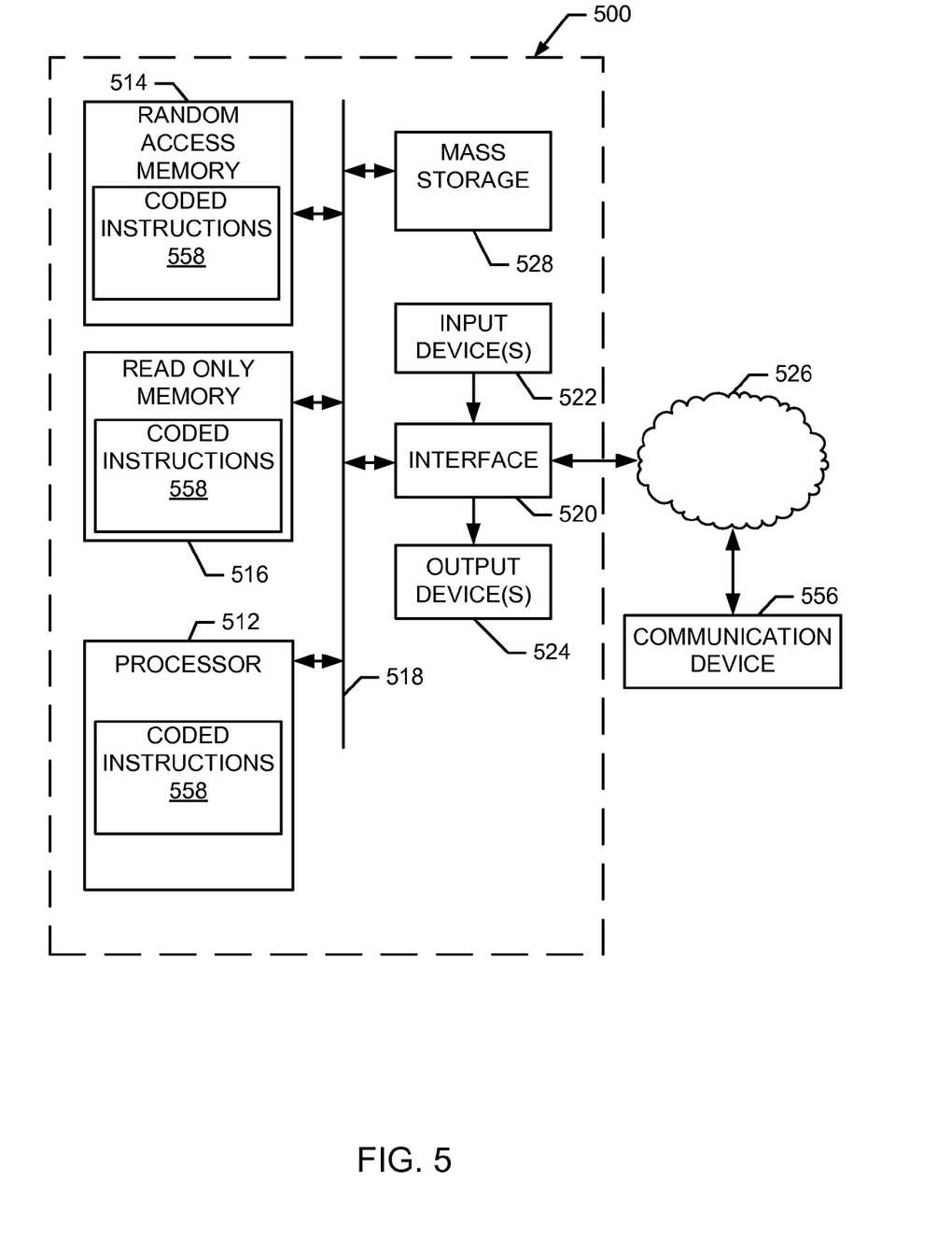
FIG. 5 is a block diagram of an example system that may execute the example machine readable instructions of FIGS. 3-4 to implement the example device environment of FIG. 1, and/or to implement the example SSO extender of FIGS. 1 and 2.

FIG. 5 is a block diagram of an example computer 500 capable of executing the instructions of FIGS. 3 and 4 to implement the SSO extender 114 of FIGS. 1 and 2. The computer 500 can be, for example, a server, a personal computer, a mobile phone (e.g., a cell phone), a personal digital assistant (PDA), an Internet appliance, a gaming console, a set top box, or any other type of computing device.

The computer 500 of the instant example includes a processor 512. For example, the processor 512 can be implemented by one or more microprocessors or controllers from any desired family or manufacturer.

The processor 512 is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The computer 500 also includes an interface circuit 520. The interface circuit 520 may be implemented by any type of interface standard, such as an Ethernet interface, a universal serial bus (USB), and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 are also connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device (e.g., communication device 556) such as a modem or network interface card to facilitate exchange of data with external computers via a network 526 (e.g., an Ethernet connection, a digital subscriber line (DSL), a telephone line, coaxial cable, a cellular telephone system, etc.).

The computer 500 also includes one or more mass storage devices 528 for storing software and data. Examples of such mass storage devices 528 include floppy disk drives, hard drive disks, compact disk drives and digital versatile disk (DVD) drives.

The coded instructions 558 of FIGS. 3 and 4 may be stored in the mass storage device 528, in the volatile memory 514, in the non-volatile memory 516, and/or on a removable storage medium such as a CD or DVD. From the foregoing, it will be appreciated that the above disclosed methods, apparatus and articles of manufacture facilitate configuration of SSO services on a user device. By monitoring web session activity, the SSO services may be activated at a time that minimizes user distraction, and detects the presence of SSO service opportunities for users unfamiliar with one or more SSO service opportunities. In the event the user has already provided authentication information to begin a web session, example methods, apparatus and articles of manufacture suppress additional prompts to enter such information when configuring one or more SSO services.

Methods, systems, apparatus and articles of manufacture are disclosed to facilitate single sign-on services. Some disclosed example methods include monitoring web session activity for an indication of entry of first credentials, identifying an SSO framework associated with the device in response to detecting a context event indicative of web session termination, querying the SSO framework for second credentials associated with the web session, and configuring SSO services on the device when the second credentials are absent from the SSO framework. Additionally, the example methods include querying the SSO framework for an indication of a decline request, suppressing user prompts in response to detecting the decline request, and identifying a credential field type associated with the web session in response to detecting an absence of the decline request. Still further methods include employing the credential field type including at least one of a username field, a password field, or a challenge question field, in which the credential field type is defined by a plug-in associated with the web session. Example methods also include comparing the credential field type with the first credentials to determine whether authentication requirements for the web session are satisfied, suppressing a credential entry prompt and invoking a permission prompt when the credential field type matches the first credentials, and identifying a missing credential field type when the credential field type does not match the first credentials.

Example apparatus to facilitate single sign-on services include a credential input monitor to monitor web session activity for an indication of entry of first credentials, a context event monitor to detect a context event indicative of web session termination, and an SSO framework interface to identify an SSO framework associated with the device in response to the context event, the context event monitor to query the SSO framework for second credentials and to configure SSO services on the device when the second credentials are absent from the SSO framework. Additionally, the example SSO framework interface is to query the SSO framework for an indication of a decline request, and includes an extender prompt engine to suppress user prompts in response to detecting the decline request, in which the credential input monitor is to identify a credential field type associated with the web session in response to detecting an absence of the decline request. Example disclosed apparatus also includes the example credential input monitor to detect at least one of a username field, a password field, or a challenge question field, includes a plug-in associated with the web session to provide authentication field requirements, and includes a credential comparator to compare the credential field type with the first credentials to determine whether authentication requirements for the web session are satisfied.

Some disclosed example articles of manufacture storing machine readable instructions are included that, when executed, cause a machine to monitor web session activity for an indication of entry of first credentials, identify an SSO framework associated with the device in response to detecting a context event indicative of web session termination, query the SSO framework for second credentials associated with the web session, and configure SSO services on the device when the second credentials are absent from the SSO framework. Other example articles of manufacture cause the machine to query the SSO framework for an indication of a decline request, to suppress user prompts in response to detecting the decline request, and to identify a credential field type associated with the web session in response to detecting an absence of the decline request. Still further example articles of manufacture cause the machine to identify at least one of a username field, a password field, or a challenge question field, to identify the credential field type from a plug-in associated with the web session, and to compare the credential field type with the first credentials to determine whether authentication requirements for the web session are satisfied. Other example articles of manufacture cause the machine to suppress a credential entry prompt and invoking a permission prompt when the credential field type matches the first credentials, and to identify a missing credential field type when the credential field type does not match the first credentials.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to configure single sign-on (SSO) services for a user device, comprising:
    monitoring, by executing a computer readable instruction with at least one processor, web session activity on the user device for an indication of entry of first credentials;
    in response to detecting a context event indicative of termination of a web session corresponding to the web session activity by a user of the user device, discovering, by executing a computer readable instruction with the at least one processor, a presence of an inactive SSO framework contained on the user device, the context event being at least one of a selection of a log off button of a website associated with the web session, a minimization of a user interface of a web browser associated with the web session, or a period of inactivity of an input device of the user device during the web session;
    querying, by executing a computer readable instruction with the at least one processor, the discovered SSO framework for second credentials associated with the web session;
    querying, by executing a computer readable instruction with the at least one processor, the discovered SSO framework for an indication of a decline request, the decline request to suppress one or more user prompts;
    in response to detecting an absence of the decline request, identifying, by executing a computer readable instruction with the at least one processor, a credential field type associated with the web session; and
    configuring, by executing a computer readable instruction with the at least one processor, the SSO services on the user device when the second credentials are absent from the discovered SSO framework.

2. A method as described in claim 1, further including suppressing one or more user prompts in response to detecting the decline request.

3. A method as described in claim 1, wherein the credential field type includes at least one of a username field, a password field, or a challenge question field.

4. A method as described in claim 1, wherein the credential field type is defined by a plug-in associated with the web session.

5. A method as described in claim 1, further including comparing the credential field type with the first credentials to determine whether authentication requirements for the web session are satisfied.

6. A method as described in claim 5, further including suppressing a credential entry prompt and invoking a permission prompt when the credential field type matches the first credentials.

7. A method as described in claim 5, further including identifying a missing credential field type when the credential field type does not match the first credentials.

8. A method as described in claim 1, further including querying the discovered SSO framework for a permission detail, wherein the configuring of the SSO services on the user device is in response to detecting the permission detail.

9. A method as described in claim 8, wherein the permission detail indicates at least one of expiration of a credential associated with the discovered SSO framework, modification of an Internet protocol address associated with the user device, deletion of a cookie associated with the user device, or deletion of a temporary file associated with the user device.

10. An apparatus to configure single sign-on (SSO) services for a user device, comprising:
    a credential input monitor to monitor a web session on the user device for an indication of entry of first credentials;
    a context event monitor to detect at least one of a selection of a log off button of a website associated with the web session, a minimization of a user interface of a web browser associated with the web session, or a period of inactivity of an input device of the user device during the web session; and
    an SSO framework interface to:
        discover a presence of an inactive SSO framework contained on the user device in response to the at least one of the selection, the minimization, or the period of inactivity;
        query the discovered SSO framework for second credentials associated with the web session;

query the discovered SSO framework for an indication of a decline request, the decline request to suppress one or more user prompts;

in response to detecting an absence of the decline request, identify a credential field type associated with the web session; and configure the SSO services on the user device when the second credentials are absent from the discovered SSO framework, at least one of the credential input monitor, the context event monitor and the SSO framework interface implemented by a logic circuit.

11. An apparatus as described in claim 10, further including an extender prompt engine to suppress one or more user prompts in response to detecting the decline request.

12. An apparatus as described in claim 10, wherein the credential input monitor is to detect at least one of a username field, a password field, or a challenge question field.

13. An apparatus as described in claim 10, further including a plug-in associated with the web session to provide authentication field requirements.

14. An apparatus as described in claim 10, further including a credential comparator to compare the credential field type with the first credentials to determine whether authentication requirements for the web session are satisfied.

15. A tangible computer readable medium comprising instructions that, when executed, cause a user device to, at least:

monitor a web session on the user device for entry of first credentials;

discover the presence of an inactive single sign-on (SSO) framework contained on the user device in response to detecting at least one of a selection of a log off button of a website associated with the web session, a minimization of a user interface of a web browser associated with the web session, or a period of inactivity of an input device of the user device during the web session;

query the discovered SSO framework for second credentials associated with the web session;

query the discovered SSO framework for an indication of a decline request, the decline request to suppress one or more user prompts;

in response to detecting an absence of the decline request, identify a credential field type associated with the web session; and configure SSO services on the user device when the second credentials are absent from the discovered SSO framework.

16. A tangible computer readable medium as described in claim 15, further including instructions that, when executed, cause the user device to suppress one or more user prompts in response to detecting the decline request.

17. A tangible computer readable medium as described in claim 15, further including instructions that, when executed, cause the user device to identify at least one of a username field, a password field, or a challenge question field.

18. A tangible computer readable medium as described in claim 15, further including instructions that, when executed, cause the user device to identify the credential field type from a plug-in associated with the web session.

19. A tangible computer readable medium as described in claim 15, further including instructions that, when executed, cause the user device to compare the credential field type with the first credentials to determine whether authentication requirements for the web session are satisfied.

20. A tangible computer readable medium as described in claim 19, further including instructions that, when executed, cause the user device to suppress a credential entry prompt and invoking a permission prompt when the credential field type matches the first credentials.

21. A tangible computer readable medium as described in claim 19, further including instructions that, when executed, cause the user device to identify a missing credential field type when the credential field type does not match the first credentials.

* * * * *